United States Patent [19]

Nakamura et al.

[11] Patent Number: 5,668,616
[45] Date of Patent: Sep. 16, 1997

[54] FERROELECTRIC LIQUID CRYSTAL DEVICE WITH ALIGNMENT LAYERS HAVING SURFACE UNEVENNESS DIFFERENT FROM EACH OTHER

[75] Inventors: Katsutoshi Nakamura, Hiratsuka; Nobuhiro Ito, Sagamiohara, both of Japan

[73] Assignee: Canon Kabushiki Kaisha, Tokyo, Japan

[21] Appl. No.: 312,922

[22] Filed: Sep. 30, 1994

[30] Foreign Application Priority Data

Sep. 30, 1993 [JP] Japan ................. 5-269750
Sep. 30, 1994 [JP] Japan ................. 6-261332

[51] Int. Cl.⁶ .......... G02F 1/1337; G02F 1/141; G02F 1/1333
[52] U.S. Cl. .......... 349/128; 349/133; 349/138
[58] Field of Search .......... 359/78, 771, 56, 359/75, 79, 100

[56] References Cited

U.S. PATENT DOCUMENTS

| | | | |
|---|---|---|---|
| 4,367,924 | 1/1983 | Clark et al. | 350/334 |
| 4,491,391 | 1/1985 | Nickol et al. | 359/75 |
| 4,648,691 | 3/1987 | Oguchi et al. | 359/87 |
| 5,132,816 | 7/1992 | Itoh et al. | 359/56 |
| 5,182,662 | 1/1993 | Mihara | 359/100 |
| 5,321,537 | 6/1994 | Okada et al. | 359/78 |
| 5,353,141 | 10/1994 | Onuma et al. | 359/78 |
| 5,381,256 | 1/1995 | Hanyu et al. | 359/75 |

FOREIGN PATENT DOCUMENTS

| | | | |
|---|---|---|---|
| 57-79913 | 5/1982 | Japan | 359/75 |
| 3154030 | 7/1991 | Japan | 359/56 |
| 4-181219 | 6/1992 | Japan | 359/56 |
| 4-338924 | 11/1992 | Japan | 359/56 |

OTHER PUBLICATIONS

Jpn. J. Appl. Phys. vol. 19 (1980), No. 10, "Simple method of determining liquid crystal tilt-bins angle", pp. 2013-2014.

*Primary Examiner*—Anita Pellman Gross
*Assistant Examiner*—Toan Ton
*Attorney, Agent, or Firm*—Fitzpatrick, Cella, Harper & Scinto

[57] ABSTRACT

A liquid crystal device is constituted by disposing a liquid crystal between a pair of substrates each provided with an electrode, an insulating layer, and an alignment control layer. At least one of the alignment control layers is provided with a surface unevenness effective for suppressing a liquid crystal movement causing the increase in cell thickness. One of the alignment control layers has a surface shape corresponding the surface unevenness but the surface shape is different from that of the other alignment control layer.

18 Claims, 8 Drawing Sheets

FERROELECTRIC LIQUID CRYSTAL DEVICE WITH ALIGNMENT LAYERS HAVING SURFACE UNEVENNESS DIFFERENT FROM EACH OTHER

FIELD OF THE INVENTION AND RELATED ART

The present invention relates to a liquid crystal device including a ferroelectric liquid crystal (FLC) and a liquid crystal apparatus including the liquid crystal device.

A display device of the type which controls transmission of light in combination with a polarizing device by utilizing the refractive index anisotropy of ferroelectric liquid crystal molecules has been proposed by Clark and Lagerwall (U.S. Pat. No. 4,367,924, etc.). The ferroelectric liquid crystal has generally chiral smectic C phase (SmC*) of H phase (SmH*) of a non-helical structure and, in this state, shows a property of taking either one of a first optically stable state and a second optically stable state responding to an electrical field applied thereto and maintaining such a state in the absence of an electrical field, namely bistability, and also exhibits a rapid response to a change in electrical field. Thus, it is expected to be utilized in a high speed and memory type display device and particularly to provide a large-area, high-resolution display.

However, a problem has been found a problem that, when such a ferroelectric liquid crystal device is continually driven for a long time, liquid crystal molecules are moved and, as a result, the thickness along a cell side is gradually increased to show a pale yellow tint.

Figure 1A:
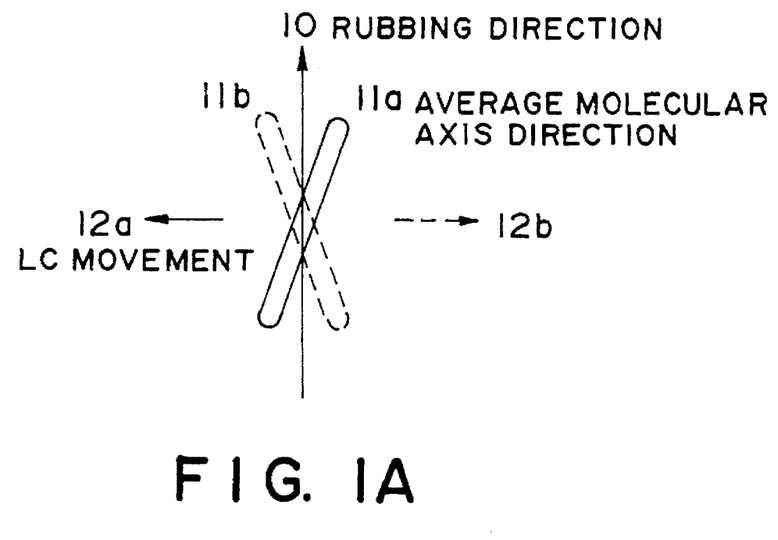
FIGS. 1A and 1B are explanatory views for illustrating a cell thickness increase along a cell side in relation with liquid crystal movement directions.
Figure 1B:
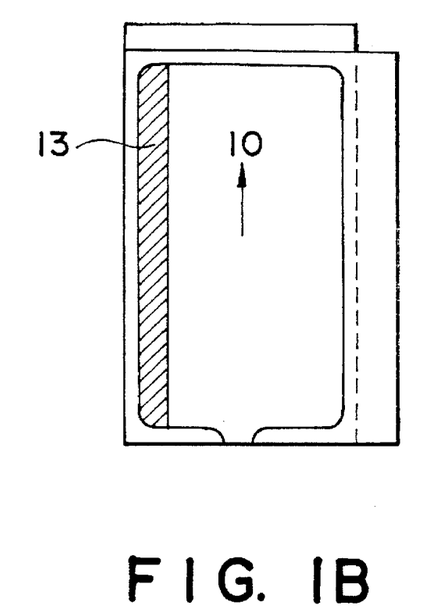

According to our study, such liquid crystal molecule movement may presumably be attributable to an electrodynamic effect caused by perturbation of liquid crystal molecule dipole moments in an AC-like electric field caused by continuation of drive pulses. Further, according to our experiments, it is confirmed that the directions 12a and 12b of the liquid crystal molecule movement are determined in relation with the uniaxial alignment treatment direction (or rubbing direction) 10 and the average liquid crystal molecular axis position 11a or 11b as shown in FIG. 1A. As the moving direction of liquid crystal molecules is related with the direction of uniaxial alignment treatment, the above-mentioned phenomenon is assumed to depend on the pre-tilt state at the substrate surfaces. Referring to FIGS. 1A and 1B, reference numeral 11a (or 11b in a reverse orientation state) denotes an average molecular axis (director) orientation. When the liquid crystal molecules (described herein as having a negative spontaneous polarization) are oriented to provide the average molecular axis 11a and are supplied with a certain strength of AC electric field not causing a switching to the orientation state 11b, the liquid crystal molecules are liable to move in the direction of an arrow 12a in the case where the substrates are provided with rubbing axes extending in parallel and in the same direction 10. As a result, the cell thickness in a region 13 is increased gradually to show a yellowish tint. If the liquid crystal molecules are placed in a state providing an average molecular axis 11b, the liquid crystal movement under AC application is caused in the reverse direction 12b. In either case, the liquid crystal movement is caused in a direction perpendicular to the uniaxial alignment treatment direction (rubbing direction), i.e., in the direction of extension of smectic layers.

This liquid crystal movement phenomenon depends on an alignment state in the cell. More specifically, this phenomenon hardly occurs in C2 alignment but is remarkably observed in C1 alignment and uniform alignment described hereinafter.

Figure 2:
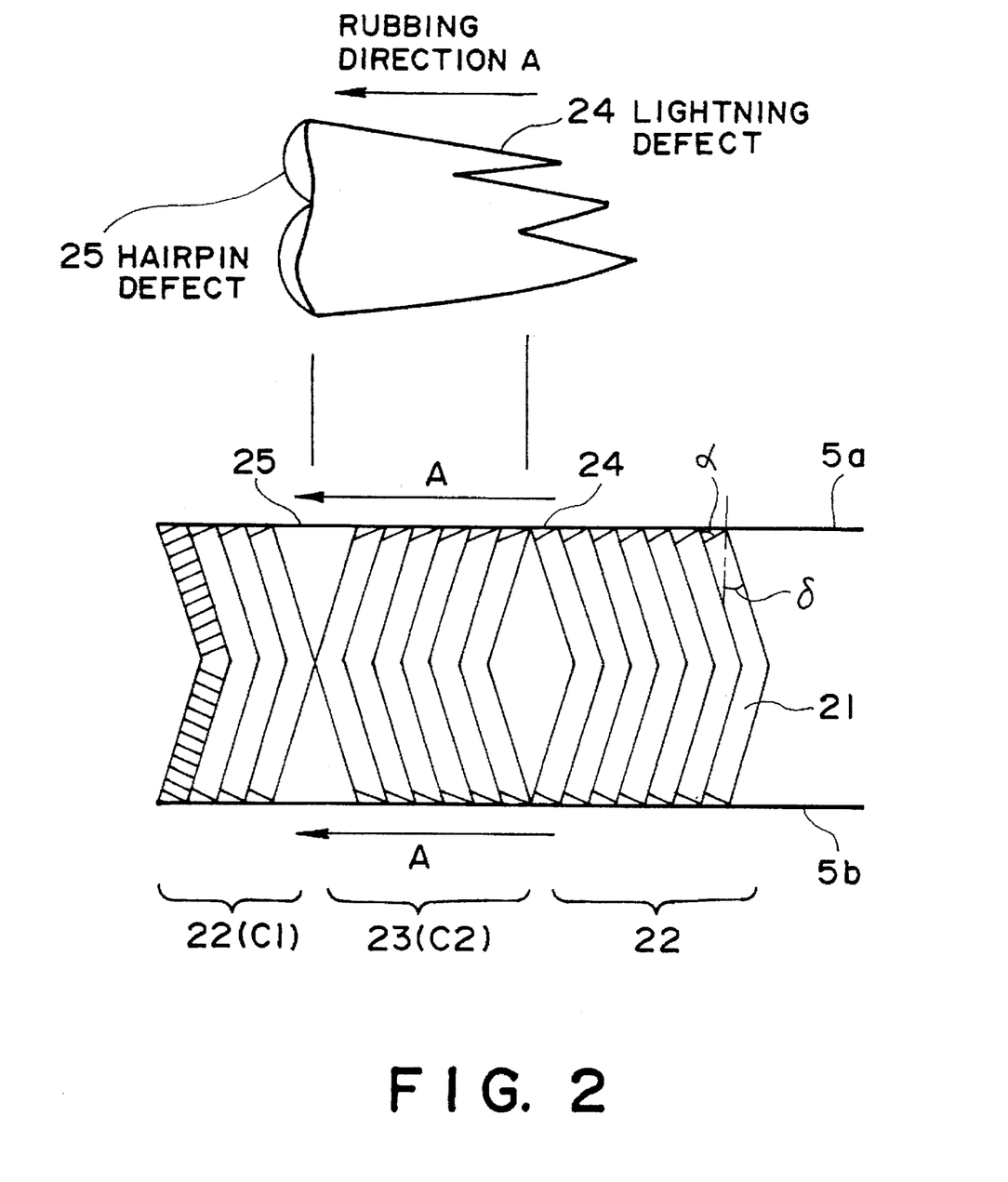
FIG. 2 is an explanatory view for illustrating an alignment state occurring in a chiral smectic liquid crystal used in the invention.

The two alignment states C1 and C2 may be explained by a difference in chevron structure of smectic layers as shown in FIG. 2. Referring to FIG. 2, reference numeral 21 denotes a smectic layer showing ferroelectricity, 22 denotes a C1 alignment region, and 23 denotes a C2 alignment region. A smectic liquid crystal generally has a layer structure and causes a shrinkage of layer pitch when it is transformed from SmA (smectic A) phase into SmC (smectic C) phase or SmC* (chiral smectic C) phase, to result in a structure accompanied with a bending of layers between the upper and lower substrates 5a and 5b (chevron structure) as shown in FIG. 2. The bending of the layers 21 can be caused in two ways corresponding to the C1 and C2 alignment as shown. As is well known, liquid crystal molecules at the substrate surfaces are aligned to form a certain angle α (pre-tilt) as a result of uniaxial alignment treatment (rubbing) in a direction A in such a manner that their heads (leading ends) in the rubbing direction are up (or away) from the substrate surfaces 5a and 5b. Because of the pre-tilt, the C1 and C2 alignment states are not equivalent to each other with respect to their elastic energy, and a transition between these states can be caused at a certain temperature or when supplied with a mechanical stress. When the layer structure shown in FIG. 2 is viewed in plan as shown in the upper part of FIG. 2, a boundary 24 of transition from C1 alignment (22) to C2 alignment (23) in the rubbing direction A looks like a zigzag lightning and is called a lightning defect, and a boundary 25 of transition from C2 alignment (23) to C1 alignment (22) forms a broad and moderate curve and is called a hairpin defect.

When FLC is disposed between a pair of substrates 5a and 5b and placed in an alignment state satisfying a relationship of $\text{(H)}<\alpha+\delta$, wherein α denotes a pretilt angle of the FLC, $\text{(H)}$ denotes a tilt angle (a half of cone angle), and δ denotes an angle of inclination of SmC* layer, there are four states each having a chevron structure in the C1 alignment state. These four C1 alignment states are different from the known C1 alignment state. Further, two among the four C1 alignment states form bistable states (uniform alignment). Herein, two states among the four C1 states giving an apparent tilt angle $\theta_a$ therebetween in the absence of an electric field satisfying a relationship of $\text{(H)}>\theta_a>\text{(H)}/2$ inclusively referred to as a uniform state.

Figure 3A:
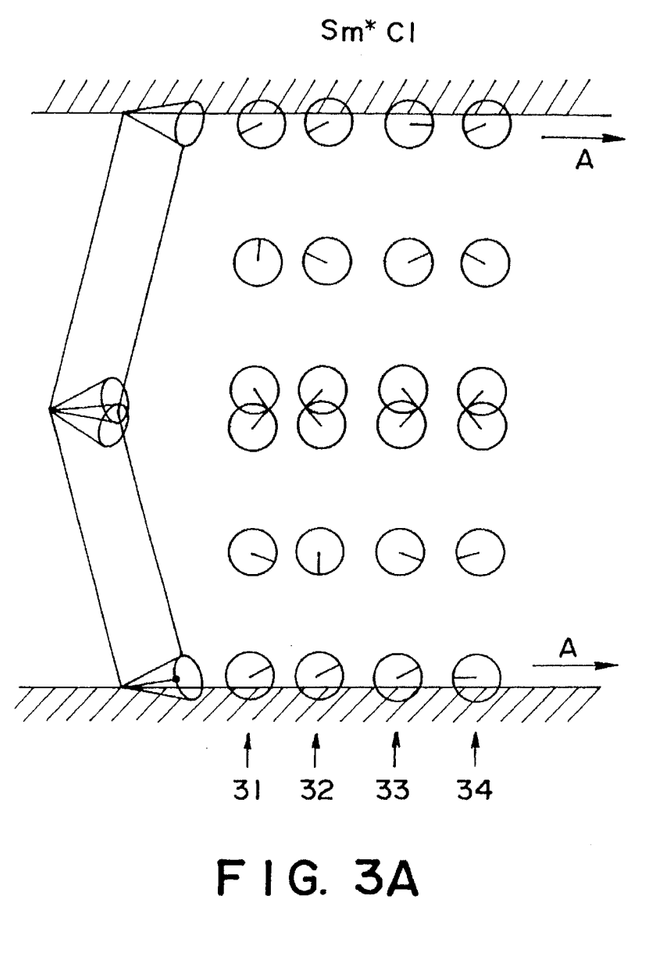
FIGS. 3A and 3B are explanatory views for illustrating changes in director orientation according to various positions between substrates in C1 alignment and C2 alignment, respectively.
Figure 3B:
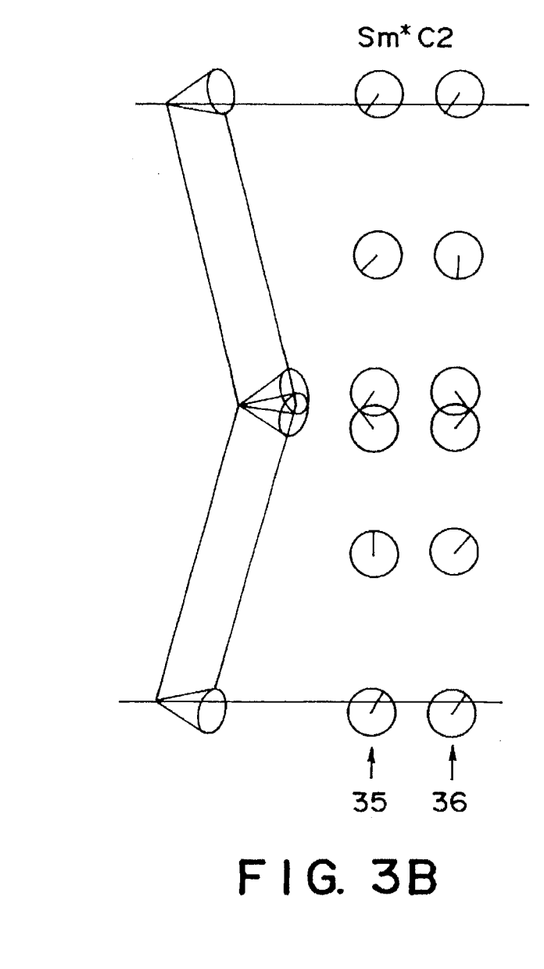

In the uniform state, the directors are believed to be not twisted between the substrates in view of optical properties thereof. FIG. 3A is a schematic view illustrating director positions between the substrates in the respective states in C1 alignment. More specifically, at 31–34 are respectively shown changes in director positions between the substrates in the form of projections of directors onto cone bottoms as viewed from each bottom. At 31 and 32 is shown a splay state, and at 33 and 34 is shown a director arrangement which is believed to represent a uniform alignment state. As is understood from FIG. 3A, at 33 and 34 representing a uniform state, the molecule position (director) is different from that in the splay state either at the upper substrate or lower substrate. FIG. 3B shows two states 35 and 36 in C2 alignment between which no switching is observed at the boundaries but an internal switching is observed. The uniform state in C1 alignment provides a larger tilt angle $\theta_a$ and thus a higher brightness and a higher contrast than the conventionally used bistable state in C2 alignment.

SUMMARY OF THE INVENTION

An object of the present invention is to provide a ferroelectric liquid crystal device wherein the local change in cell thickness caused by the movement of liquid crystal molecules during drive is prevented.

Another object of the present invention is to provide a liquid crystal apparatus including the liquid crystal device.

According to the present invention, there is provided a liquid crystal device, comprising:

a pair of substrates disposed opposite to each other each having thereon an alignment control layer, and a liquid crystal disposed between the substrates;

at least one of the alignment control layers disposed on the substrates being provided with a surface unevenness; and both of the alignment control layers having surface shapes different from each other.

According to the present invention, there is also provided a liquid crystal apparatus including the liquid crystal device.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

The liquid crystal device according to the present invention is characterized by providing at least one of alignment control layers with a surface unevenness so that one of the alignment control layers has a surface shape different from a surface shape of the other alignment control layer. Based on such a cell structure of the liquid crystal device, the movement of liquid crystal molecules during drive of the device can effectively be suppressed.

According to our study, for example, a direction or a degree of the above-mentioned movement of liquid crystal molecules can be determined depending upon a surface shape of the entire alignment control layer contacting the liquid crystal layer. In view of this point, the liquid crystal device of the invention prevents the movement of liquid crystal molecules within the entire liquid crystal layer by providing the surface of at least one of the alignment control layers contacting the liquid crystal with a surface unevenness capable of causing liquid crystal molecule movement under a prescribed drive condition so that one of the alignment control layers has an entire surface shape different from an entire surface shape of the other alignment control layer thereby providing different moving states of the liquid crystal molecules at two substrate boundaries so as to be opposite to each other under the prescribed drive condition.

In the present invention, the alignment control layers may preferably be subjected to a uniaxial alignment treatment, e.g., by rubbing so that the directions of the uniaxial alignment treatment are substantially parallel, particularly are substantially parallel and in the same direction.

In a preferred embodiment, different surface shapes of the alignment control layers formed on a pair of substrates may be formed by:

(a) providing one of the alignment control layers with an uneven surface and providing the other alignment control layer with a substantially smooth surface, inclusive of a uniaxially aligned surface, and (b) providing both of the alignment control layers with uneven surfaces different from each other in height, diameter, pitch, density, etc., with respect to concavities and convexities constituting each surface unevenness.

The different surface shapes may more preferably by formed by the above method (a) in view of facilitation of control of the moving directions of liquid crystal molecules such that the liquid crystal molecules are reliably moved in opposite directions in the vicinities of upper and lower substrate boundaries.

The surface unevenness provided to the alignment control layer may be formed in various manners; e.g., by applying an alignment control layer-forming solution and then baking the alignment control layer-forming solution under a prescribed condition (e.g., at 270° C. for 1 hour); by dispersing prescribed-shaped fine particles in an alignment control layer at a prescribed density or disposing prescribed-shaped fine particles on an alignment control layer at a prescribed density; by dispersing prescribed-shaped fine particles in an under layer of an alignment control layer, particularly in an insulating layer, at a prescribed density; and by forming unevenness on an insulating layer or an alignment control layer by a mechanical method (e.g., by stamping).

Among the above methods, the method of dispersing the prescribed-shaped fine particles in the under layer of the alignment control layer, particularly in the insulating layer, at the prescribed density may more preferably be used in the invention in view of facilitation of control of an uneven shape and alleviation of damage to alignment of liquid crystal molecules.

The surface unevenness may appropriately be provided depending upon the moving direction of liquid crystal molecules under a prescribed drive condition and other factors of the resultant liquid crystal device, such as, liquid crystal material used, thicknesses of an alignment control layer and an insulating layer, a cell gap and conditions for driving the liquid crystal device.

In the present invention, the surface unevenness may preferably have a difference in height (as measured through microscope observation based on a flat portion as a reference level) of 10–500 nm, more preferably 30–200 nm. The surface unevenness may preferably have a density of $10^5$–$10^{13}$/mm$^2$, more preferably $10^6$–$10^{12}$/mm$^2$.

The moving state of liquid crystal molecules in the present invention can considerably vary under the influence of a difference in height and/or a density of the surface unevenness and a relationship between a drive condition and such a difference in height and/or density.

In the case where the surface unevenness is provided to one of the alignment control layers alone and a drive condition including a pulse width of 15–100 μsec and a bias ratio of at most ½.5 is employed, the surface unevenness may preferably be controlled to have the above-mentioned difference in height and/or density, whereby the movement of liquid crystal molecules within the entire liquid crystal device is effectively suppressed.

The surface unevenness may have an arbitrary shape but may preferably comprises concavities in the form of dimples or convexities in the form of dots, semispheres or domes because these shapes can be easily formed by using fine particles. For example, the surface unevenness in the form of dimples can be formed by once dispersing fine particles in an alignment control layer-forming solution and removing the fine particles therefrom after forming an alignment control layer. Similarly, circular concavities or convexities are also preferred.

The thickness of the alignment film may be set to show an appropriate degree of function of preventing or suppressing the liquid crystal movement while showing a sufficient alignment effect and may preferably be 5–100 nm, more preferably be 10–40 nm.

The dimples or concavities formed may have a depth D satisfying D>0.1d with respect to the thickness d of the alignment control layer.

In the present invention, surface shapes of the alignment control layers formed on the pair of substrates are differentiated from each other by appropriately selecting the factors including the difference in height, density and drive condition within the above-mentioned ranges, so that the moving directions at each substrate boundary during drive are controlled to be substantially opposite to each other. Particularly, the difference in height and density of the surface unevenness are required to be set to an appropriate level within the above-mentioned levels because the liquid crystal movement during drive is largely depending on such factors.

Hereinbelow, as a preferred embodiment of the invention, a liquid crystal device having different surface shapes of alignment control layers formed by the above-mentioned method (a), i.e., surface shapes including an uneven surface shape formed on one of the alignment control layers and a smooth surface shape formed on the other alignment control layer, will be explained with reference to FIG. 4.

Figure 4:
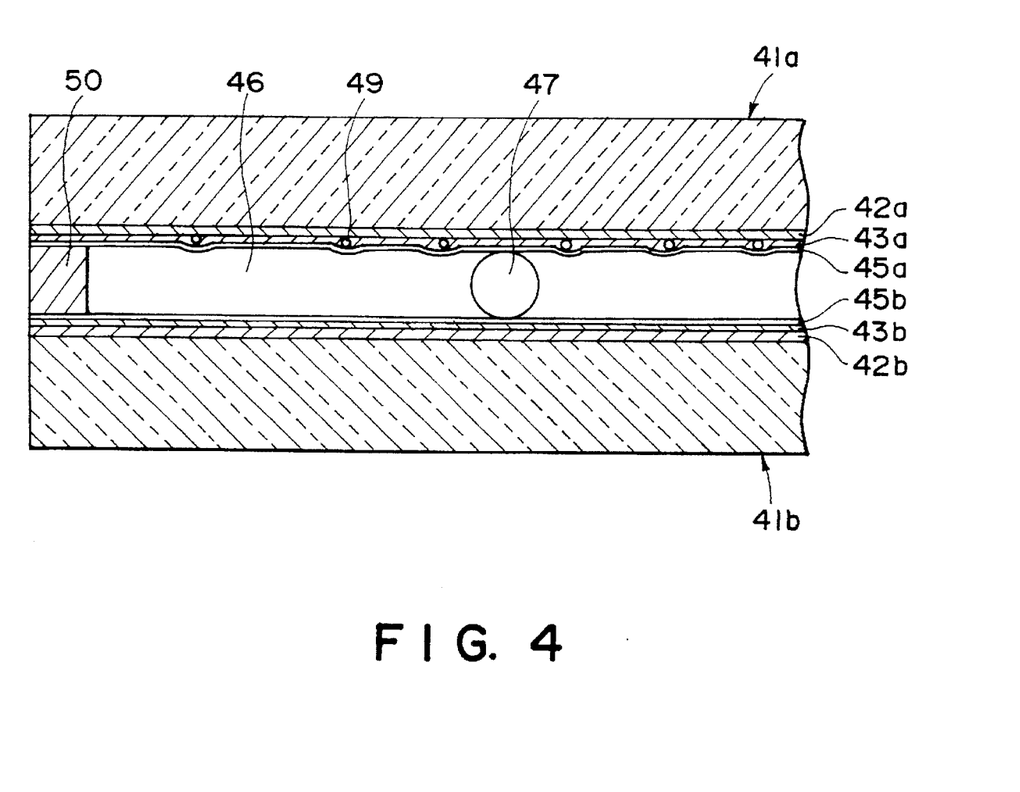
FIG. 4 is a schematic sectional view of an embodiment of the liquid crystal device (cell) according to the invention wherein fine particles are dispersed in one of the insulating layers.

Referring to FIG. 4, the liquid crystal device includes two substrates 41a and 41b, and transparent electrodes 42a and 42b, insulating films (layers) 43a and 43b and alignment control films (layers) 45a and 45b sequentially formed on the substrates 41a and 41b. The transparent electrodes 42a and 42b may generally have a thickness of about 40–300 nm and the insulating layers 43a and 43b may generally have a thickness of 10–300 nm. In the insulating film 43a formed on the substrate 41a being one of the above-mentioned two substrates 41a and 41b, fine particles 49 with an average particle size of 10–100 nm are dispersed at a prescribed dispersion density (content) thereby providing the surface of the insulating film 43a with an uneven shape. The alignment control films 45a and 45b may generally have a thickness of 5–100 nm and the alignment control film 45a being one of them has a surface unevenness resulting from the dispersed fine particles 49. The surface of the alignment control film 45a can have shapes depending upon those of the fine particles 49. When the alignment control film 45a has a surface shape comprising convexities in the form of domes, the surface shape (surface unevenness) may preferably include a difference in height of 10–500 nm. In the case of concavities in the form of dimples, the surface shape may preferably include a diameter of 0.1– 10 nm.

On the other hand, the other alignment control film 45b has a substantially smooth (even) surface since the fine particles 49 are not contained in the insulating film 43b coated with the alignment control film 45b. Thus, the two alignment control films 45a and 45b have the surface shapes different from each other. The alignment control films 45a and 45b are subjected to uniaxial alignment treatment by known methods such as rubbing and oblique vapor deposition. The two substrates 41a and 41b are oppositely disposed by the medium of a spacer 47 so that the directions of uniaxial alignment treatment are substantially parallel. The substrates 41a and 41b are applied to each other at the periphery thereof by a sealing member 50. The spacing between the substrates 41a and 41b is filled with a liquid crystal 46, e.g., a ferroelectric liquid crystal assuming at least two stable states.

The fine particles 49 may generally be set to have an average particle size of 10–100 nm as described above. Below 10 nm, the fine particles are too minute to provide the alignment control film 45a with the surface unevenness as described above. Above 100 nm, the alignment control film 45a fails to show a sufficient alignment effect to liquid crystal molecules. The fine particles 49 may more preferably have an average particle size of 20–50 nm. The fine particles 49 may be composed of any material as long as it has a sufficient heat resistance during the step of heating or baking the alignment control layer contacting the insulating layer containing the fine particles 49. Examples of such a material may include alumina and silica.

The insulating layers 43a and 43b may comprise an inorganic material, such as TiSi, titanium oxide or zirconium oxide and an organic material, such as polyimide, polyamide-imide, polyamide, polystyrene or polyester. The insulating layer 43a and 43b may generally be formed by applying an insulating film-forming solution (containing fine particles as desired) and baking the solution. Alternatively, it is possible to form a laminated structure including the above film and another film formed by sputtering.

It is possible to compose the alignment control layer 45a or 45b of two layers, e.g., by first forming an insulating layer of an inorganic material, such as silicon nitride, silicon carbide containing hydrogen, silicon oxide, boron nitride, boron nitride containing hydrogen, cerium oxide, aluminum oxide, zirconium oxide, titanium oxide, magnesium fluoride, or TiSi and forming thereon an alignment control layer of an organic insulating material, such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin, or photoresist resin. Alternatively, it is also possible to use a single layer of inorganic insulating alignment control layer comprising the above-mentioned inorganic material or organic insulating alignment control layer comprising the above-mentioned organic material. An inorganic insulating alignment control layer may be formed by vapor deposition, while an organic insulating alignment control layer may be formed by applying a solution of an organic insulating material or a precursor thereof in a concentration of 0.1 to 20 wt. %, preferably 0.2–10 wt. %, by spinner coating, dip coating, screen printing, spray coating or roller coating, followed by curing or hardening under prescribed hardening condition (e.g., by heating).

The alignment control film (layer) 45a or 45b in the present invention may preferably be composed of polyimide, e.g., obtained through dehydration-condensation reaction between a tetracarboxylic acid component and a diamine component.

Examples of the tetracarboxylic acid component constituting the polyimide may include: pyromellitic dianhydride, biphenyltetracarboxylic dianhydride, naphthalenetetracarboxylic dianhydride, and cyclobutanetetracarboxylic dianhydride.

Examples of the diamine component may include bis[4-(aminophenoxy)phenyl]compounds represented by the following formula (I):

wherein $R_1$ and $R_2$ denote fluoroalkyl chain groups represented by $CF_3(CF_2)_l(CH_2)_{m-}$, ($l \geq 0, m \geq 0$) with the proviso that $R_1$ and $R_2$ may be the same or different.

In the present invention, the liquid crystal 6 may be a ferroelectric liquid crystal (composition) which may be used in a chiral smectic phase, more specifically in chiral smectic C phase (SmC*), H phase (SmH*), I phase (SmI*), K phase (SmK*) or G phase (SmG).

A more preferred class of the ferroelectric liquid crystal may include those showing cholesteric phase on a higher temperature side particularly those showing a phase transition from isotropic phase through cholesteric phase and smectic A phase into chiral smectic C phase in the course of temperature decrease, which may for example include a pyrimidine-based liquid crystal mixture A showing the following phase transition series and physical properties.

tilt angle Ⓗ: 14 degrees (at 30° C.) layer inclination angle δ: 11 degrees (at 30° C.) apparent tilt angle θ: 11 degrees (at 30° C.)

In the present invention, the substrates 41a and 41b may be composed of at least one material of metal, semiconductor, insulator, etc., provided that one of the substrates 41a and 41b is transparent. Examples of such a material may include glass, polymeric material, quartz, silicon and aluminum.

The transparent electrodes 42a and 42b may be composed of a thin film of, e.g., $In_2O_3$, $SnO_2$ or ITO (indium tin oxide).

The liquid crystal device including the alignment control layers provided with different surface shapes formed by the above-mentioned method (a) is effective for suppressing or preventing the liquid crystal movement during the drive of the device, thus minimizing the occurrence of the yellowing to provide a uniform display state. As described above, the reason why the liquid crystal movement is suppressed may be attributable to the phenomenon that the movement of liquid crystal molecules is prevented as a whole due to opposite moving directions of the liquid crystal at two regions including a region in the vicinity of the smooth (even) alignment control film 45b and a region in the vicinity of the uneven alignment control film 45a.

Then, as another preferred embodiment of the invention, a liquid crystal device having different surface shapes of alignment control layers formed by the above-mentioned method (b) will be explained. Respective elements and factors for constituting the liquid crystal device may be identical to those used in the liquid crystal device employing the method (a). In this embodiment, fine particles 49 contained in the insulating film 43b are set to have a prescribed average particle size (e.g., 1–100 nm) and/or a prescribed dispersion density (content) so as to provide the alignment control film 45b with an uneven surface different from an uneven surface provided to the alignment control film 45a.

Such conditions for providing different uneven surfaces can be determined in view of the following point. That is, under a prescribed drive condition, liquid crystal molecules are moved in a direction perpendicular to the direction of uniaxial alignment treatment. The direction and degree of the movement are related with the uneven shapes varying depending upon factors including a diameter, a difference in height and a density (e.g., a dispersion density) of fine particles used. For example, when the dispersion density of fine particles is increased, liquid crystal molecules are moved in a first direction perpendicular to the uniaxial alignment treatment direction. On the other hand, when the dispersion density is decreased, a degree of the movement of liquid crystal molecules in the first direction is decreased. As a result, when the dispersion density is further decreased to a certain level, liquid crystal molecules start to move in a second direction opposite to the first direction. Accordingly, in this embodiment, two types of fine particles each for the insulating film 43a or 43b are set to have the above-mentioned factors so that moving directions of liquid crystal molecules at two regions on the upper substrate side and the lower substrate side are opposite to each other, thus suppressing the movement of liquid crystal molecule as a whole.

The liquid crystal device according to the present invention is used as an element, particularly a display element, for various liquid crystal apparatus.

Figure 5:
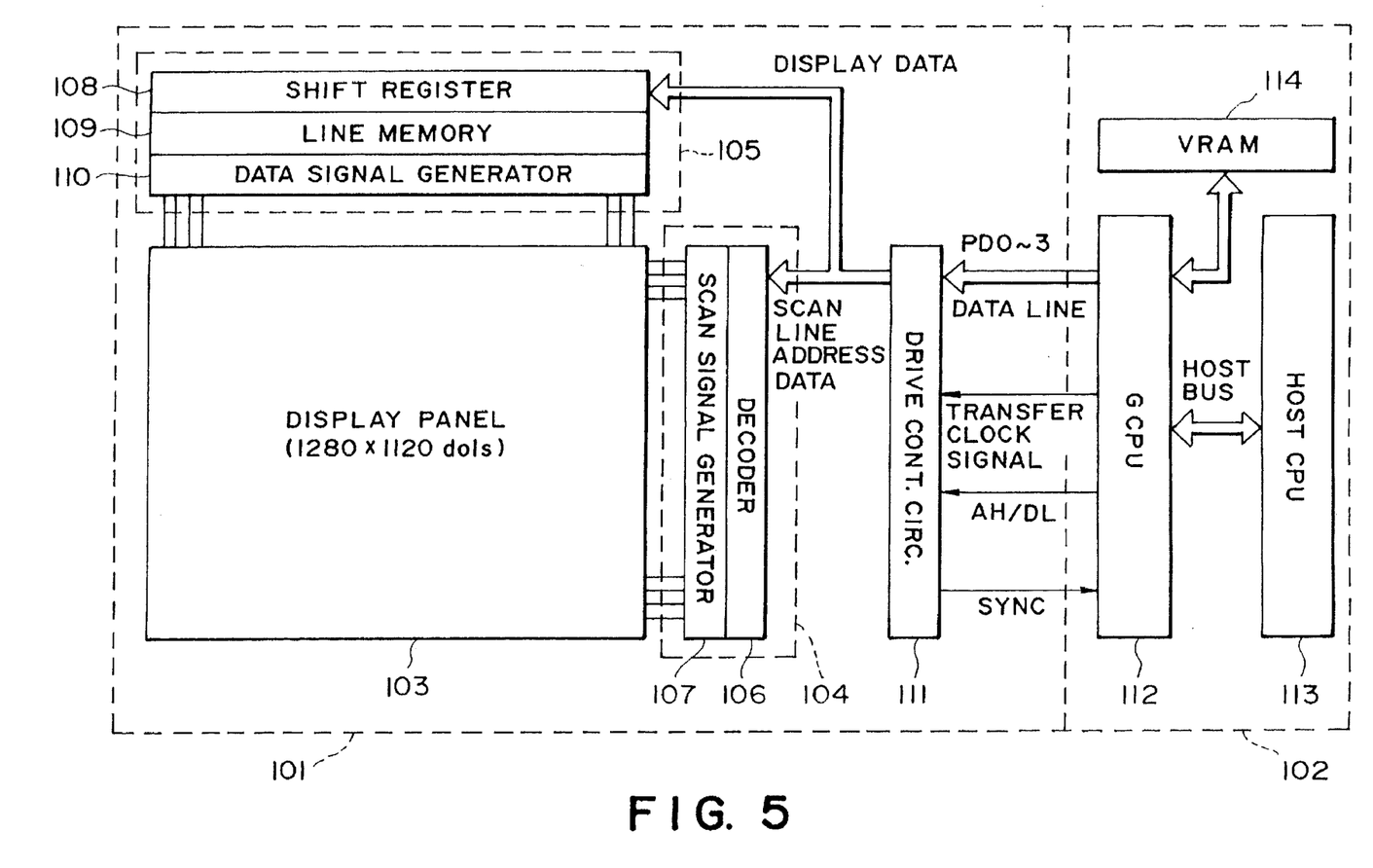
FIG. 5 is a block diagram showing a display apparatus according to the invention and a graphic controller.
Figure 6:
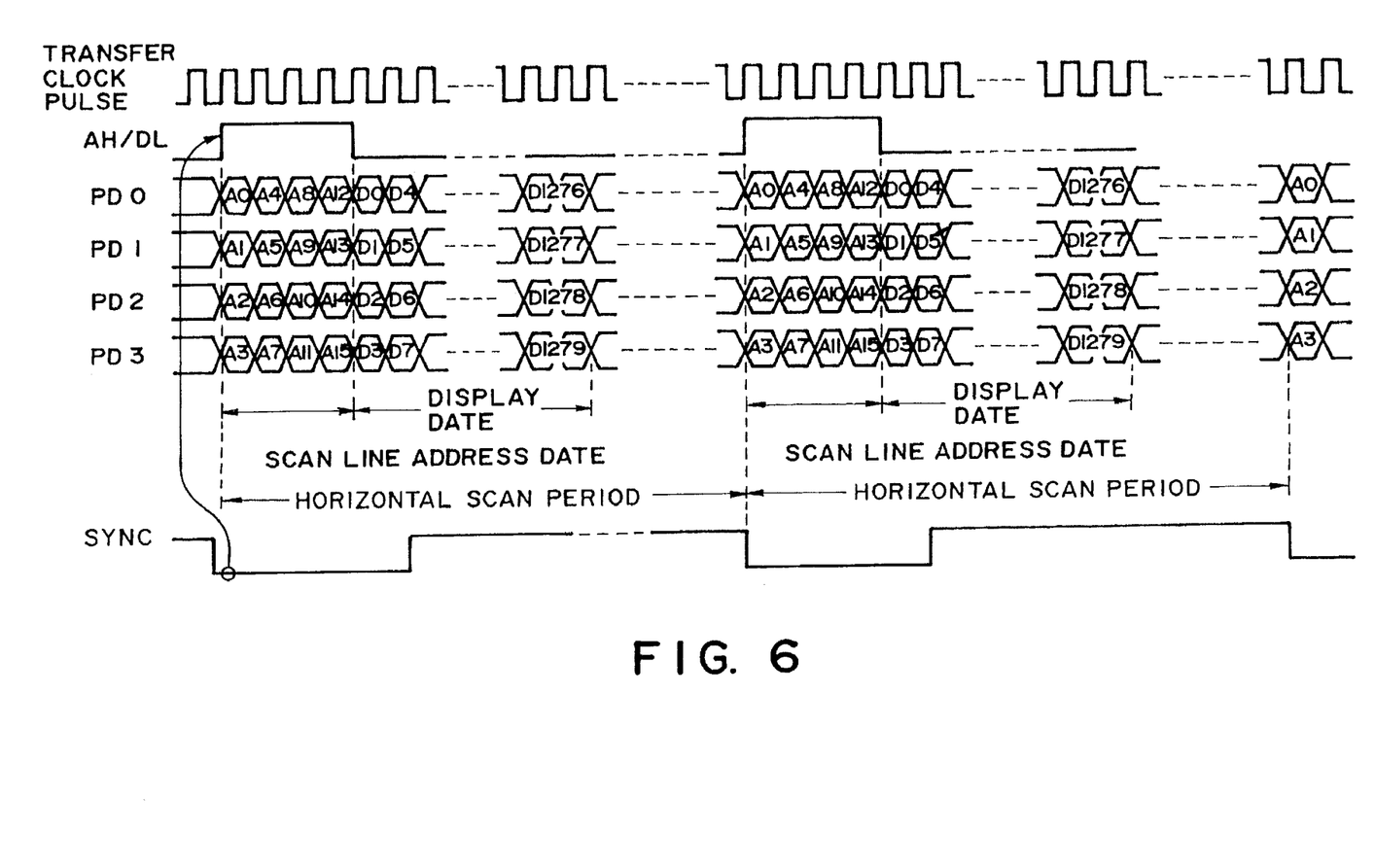
FIG. 6 is a time chart of image data communication showing time correlation between signal transfer and driving with respect to a liquid crystal display apparatus and a graphic controller.

Based on an arrangement appearing hereinbelow and data format comprising image data accompanied with scanning line address data and by adopting communication synchronization using a SYNC signal as shown in FIGS. 5 and 6, there is provided a liquid crystal display apparatus of the present invention which uses the liquid crystal device according to the present invention as a display panel portion.

Referring to FIG. 5, the liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to a display panel 103 by signal transfer means. The graphic controller 102 principally comprises a CPU (central processing unit, hereinafter referred to as "GCPU") 112 and a VRAM (video-RAM, image data storage memory) 114 and is in charge of management and communication of image data between a host CPU 113 and the liquid crystal display apparatus (FLCD) 101. The control of the display apparatus is principally performed by in the graphic controller 102. A light source (not shown) is disposed at the back of the display panel 103.

Hereinbelow, the present invention will be explained more specifically with reference to examples. It is however to be understood that the present invention is not restricted to these examples.

EXAMPLE 1

A liquid crystal device (cell) as shown in FIG. 4 was prepared in the following manner.

Referring to FIG. 4, two 1.1 mm-thick glass plates 41a and 41b each provided with about 150 nm-thick ITO transparent electrodes 42a and 42b were each coated with a 6.0 wt. % insulating film-forming solution (of Ti/Si =1/1) by printing using an extender plate with a roughness of 5 μm, followed by prebaking at 100° C. for about 10 min., irradiation with ultraviolet rays and baking at 300° C. for 1 hour, to form 20 nm-thick insulating films 43a and 43b. In the step of forming one insulating film 43a, fine particles 49 of silica with an average particle size of 50 nm (content or dispersion density: 20 wt. %) were dispersed in one insulating film-forming solution. On the other hand, in the step of forming the other insulating film 43b, silica fine particles 49 were not added to the other insulating film-forming solution.

Then, the insulating film 43a or 43b on each glass substrate 41a or 41b was coated with a 1.5 wt. % solution of a polyimide precursor ("LQ-1802"(trade name) manufactured by Hitachi Kasei K.K.) in a solvent mixture of N-methyl-pyrrolidone/n-butyl cellosolve (=1/1 ) by spin coating at 2000 rpm for 20 sec, followed by baking at 270° C. for about 1 hour to form a 20 nm-thick alignment control film 45a or 45b, which was then rubbed in one direction with a nylon-planted cloth. The alignment control films 45a and 45b provided pretilt angles of about 19 degrees and about 18.5 degrees, respectively.

Onto one of the glass substrates 41a and 41b thus treated, alumina beads as a spacer 47 of about 1.5 μm in average diameter were dispersed, and the other substrate was applied thereto so that their rubbing directions were parallel and in the same direction, to form a blank cell.

The blank cell was then filled with the pyrimidine-based liquid crystal mixture A described hereinabove in isotropic phase under vacuum and, after sealing, was gradually cooled from isotropic phase at a rate of 0.5° C./min. to room temperature, whereby an alignment was effected.

The thus-prepared liquid crystal device was continuously driven for 7 days and subjected to measurement of cell thickness change in the manner described hereinbelow. The results are show in Table 1 appearing hereinafter. As shown in Table 1, the liquid crystal device showed substantially no change in the cell thicknesses at the points A–D.

EXAMPLE 2

A liquid crystal device was prepared and evaluated in the same manner as in Example 1 except that fine particles 49 of silica with an average particle size of 30 nm were used and 10 nm-thick alignment control films 45a and 45b were formed by using a 1.0 wt. % solution of a polyimide precursor ("LQ-1802", mfd. by Hitachi Kasei K.K.) in a solvent mixture of N-methylpyrrolidone/n-butyl cellosolve (=1/1). One alignment control film 45a having a surface unevenness provided a pretilt angle of about 18 degrees. The other alignment control film having substantially no surface unevenness provided a pretilt angle of about 17 degrees.

The results are shown in Table 1.

The liquid crystal device showed substantially no change in the cell thicknesses at the points A–D.

Comparative Example 1

A liquid crystal device was prepared and evaluated in the same manner as in Example 1 except that both of insulating films 43a and 43b were prepared by dispersing silica fine particles 49 in an insulating film-forming solution so that alignment control films 45a and 45b formed on the insulating films 43a and 43b were provided with surface unevenness, respectively, similar to each other.

The results are shown in Table 1.

The liquid crystal device showed the increases in the cell thicknesses at the points A and D, thus confirming a liquid crystal movement.

Comparative Example 2

A liquid crystal device was prepared and evaluated in the same manner as in Example 1 except that both of insulating films 43a and 43b were prepared by omitting silica fine particles 49 so that alignment control films 45a and 45b formed on the insulating films 43a and 43b were not provided with surface unevenness.

The results are shown in Table 1.

The liquid crystal device showed the increases in the cell thicknesses at the points B and C, thus confirming a liquid crystal movement.

Comparative Example 3

A liquid crystal device was prepared and evaluated in the same manner as in Example 2 except that both of insulating films 43a and 43b were prepared by dispersing silica fine particles 49 in an insulating film-forming solution so that alignment control films 45a and 45b formed on the insulating films 43a and 43b were provided with surface unevenness, respectively, similar to each other.

The results are shown in Table 1.

The liquid crystal device showed the increases in the cell thicknesses at the points A and D, thus confirming a liquid crystal movement.

Comparative Example 4

A liquid crystal device was prepared and evaluated in the same manner as in Example 2 except that both of insulating films 43a and 43b were prepared by omitting silica fine particles 49 so that alignment control films 45a and 45b formed on the insulating films 43a and 43b were not provided with surface unevenness.

The results are shown in Table 1.

The liquid crystal device showed the increases in the cell thicknesses at the points B and C, thus confirming a liquid crystal movement.

EXAMPLE 3

A liquid crystal device as shown in FIG. 4 except that an insulating film 43b contained fine particles 49 was prepared in the following manner.

Referring to FIG. 4, two 1.1 mm-thick glass plates 41a and 41b each provided with about 150 nm-thick ITO transparent electrodes 42a and 42b were each coated with a 6.0 wt. % insulating film-forming solution (of Ti/Si =1/1) by printing using an extender plate with a roughness of 5 μm, followed by prebaking at 100° C. for about 10 min., irradiation with ultraviolet rays and baking at 300° C. for 1 hour, to form 20 nm-thick insulating films 43a and 43b. In the step of forming one insulating film 43a, fine particles 49 of silica with an average particle size of 50 nm (content: 20 wt. %) were dispersed in one insulating film-forming solution. On the other hand, in the step of forming the other insulating film 43b, silica fine particles 49 with an average particle size of 5 nm (content: 20 wt. %) were dispersed in the other insulating film-forming solution.

Then, the insulating film 43a or 43b on each glass substrate 41a or 41b was coated with a 1.5 wt. % solution of a polyimide precursor ("LQ-1802"(trade name) manufactured by Hitachi Kasei K.K.) in a solvent mixture of N-methyl-pyrrolidone/n-butyl cellosolve (=1/1 ) by spin coating at 2000 rpm for 20 sec, followed by baking at 270° C. for about 1 hour to form a 20 nm-thick alignment control film 45a or 45b, which was then rubbed in one direction with a nylon-planted cloth. The alignment control films 45a and 45b provided pretilt angles of about 19 degrees and about 18.5 degrees, respectively.

Onto one of the glass substrates 41a and 41b thus treated, alumina beads as a spacer 47 of about 1.5 μm in average diameter were dispersed, and the other substrate was applied thereto so that their rubbing directions were parallel and in the same direction, to form a blank cell.

The blank cell was then filled with the pyrimidine-based liquid crystal mixture A described hereinabove in isotropic phase under vacuum and, after sealing, was gradually cooled from isotropic phase at a rate of 0.5° C./min. to room temperature, whereby an alignment was effected.

The thus-prepared liquid crystal device was continuously driven for 7 days and subjected to measurement of cell thickness change in the manner described hereinbelow. The results are show in Table 1 appearing hereinafter. As shown in Table 1, the liquid crystal device showed substantially no change in the cell thicknesses at the points A–D.

EXAMPLE 4

A liquid crystal device was prepared and evaluated in the same manner as in Example 3 except that silica fine particles with an average particle size of 80 nm were used for forming one insulating film 43a and silica fine particles with an average particle size of 20 nm were used for forming the other insulating film 43b.

The results are shown in Table 1.

The liquid crystal device showed substantially no change in the cell thicknesses at the points A–D.

EXAMPLE 5

A liquid crystal device was prepared and evaluated in the same manner as in Example 3 except that silica fine particles with an average particle size of 30 nm (content: 10 wt. %) were used for forming a 20 nm-thick insulating film 43a and silica fine particles with an average particle size of 30 nm (content: 30 wt. %) were used for forming a 20 nm-thick insulating film 43b.

The results are shown in Table 1.

The liquid crystal device showed substantially no change in the cell thicknesses at the points A–D.

TABLE 1

| Ex. No. | Cell thickness before drive (μm) | | | | Cell thickness after drive (μm) | | | |
|---|---|---|---|---|---|---|---|---|
| | A | B | C | D | A | B | C | D |
| Ex. | | | | | | | | |
| 1 | 1.15 | 1.16 | 1.15 | 1.17 | 1.14 | 1.16 | 1.16 | 1.17 |
| 2 | 1.18 | 1.17 | 1.16 | 1.17 | 1.18 | 1.18 | 1.17 | 1.15 |
| Comp. Ex. | | | | | | | | |
| 1 | 1.16 | 1.17 | 1.16 | 1.16 | 1.24 | 1.13 | 1.12 | 1.26 |
| 2 | 1.17 | 1.15 | 1.16 | 1.15 | 1.11 | 1.29 | 1.28 | 1.12 |
| 3 | 1.14 | 1.15 | 1.13 | 1.14 | 1.27 | 1.16 | 1.09 | 1.24 |
| 4 | 1.17 | 1.14 | 1.15 | 1.17 | 1.12 | 1.26 | 1.26 | 1.13 |
| Ex. | | | | | | | | |
| 3 | 1.17 | 1.17 | 1.16 | 1.16 | 1.19 | 1.15 | 1.15 | 1.17 |
| 4 | 1.23 | 1.22 | 1.22 | 1.22 | 1.22 | 1.23 | 1.23 | 1.22 |
| 5 | 1.21 | 1.22 | 1.23 | 1.22 | 1.22 | 1.23 | 1.21 | 1.21 |

In the above Examples 1–5 and Comparative Examples 1–4, measurement of pretilt angle α and measurement of cell thickness change were performed in the following manner.

Measurement of pretilt angle α

The measurement was performed according to the crystal rotation method as described at Jpn. J. Appl. Phys. vol. 19 (1980), No. 10, Short Notes 2013.

More specifically, a pair of substrates were applied to each other so that liquid crystal molecules were inclined or aligned in mutually parallel and identical directions at boundaries between the substrates and a liquid crystal mixture, which was then filled with the liquid crystal mixture assuming SmA phase in the temperature range of 10°–55° C. obtained by mixing 80 wt. % of a ferroelectric liquid crystal ("CS-1014", mfd. by Chisso K.K.) with 20 wt. % of a compound represented by the following formula:

For measurement, the liquid crystal cell was rotated in a plane perpendicular to the pair of substrates and including the aligning treatment axis and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

An angle $\emptyset_x$ between a normal to the cell and the incident beam direction for providing the central point of a family of hyperbolic curves in the interference figure thus obtained was substituted in the following equation to find a pretilt angle $\alpha_o$, $$\sin 2\alpha_o = \frac{-2\sin\phi_x}{(n_o + n_e)\sqrt{1 - (\sin\phi_x/n_o)^2}}$$

wherein $n_o$ denotes the refractive index of ordinary ray, and $n_e$ denotes the refractive index of extraordinary ray.

Measurement of cell thickness change

Figure 7:
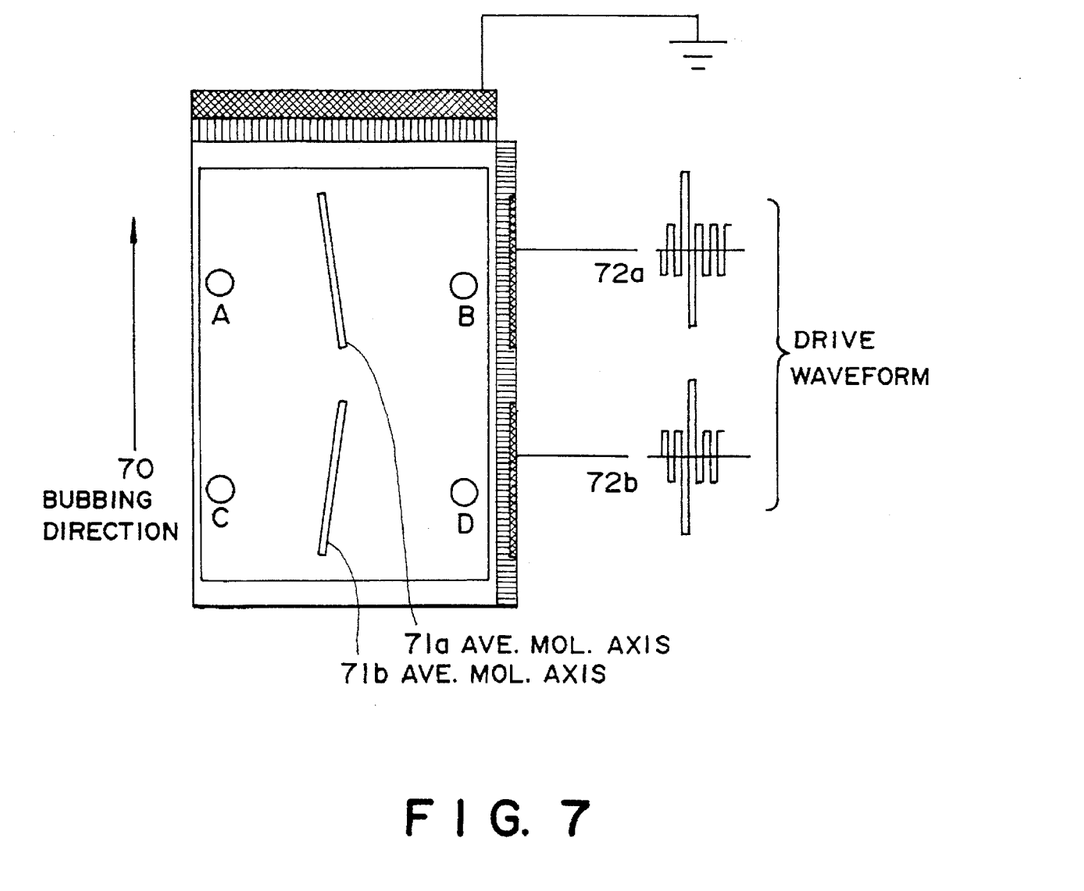
FIG. 7 is a schematic view for explaining a method of measuring a liquid crystal cell thickness change.

As shown in FIG. 7, a liquid crystal cell including a pair of glass substrates having a size of 75 mm ×75 mm was subjected to application of writing (drive) waveforms 72a and 72b having a pulse width of 30 μsec, a bias ratio of ⅓ and a duty ratio of 1/1000 so that average molecular axes 71a and 72b of a liquid crystal are located in the indicated positions with respect to a rubbing direction 70 as shown in FIG. 7. The liquid crystal cell was subjected to measurement of cell thicknesses at four points A, B, C and D before writing (before drive) and after continuous writing (after drive) for 7 days, respectively, in order to evaluate a change in cell thickness.

As apparent from the results shown in Table 1, the liquid crystal device (cells) were effective for suppressing movement of liquid crystal molecules based on surface shapes of alignment control layers (films) which were asymmetrical, i.e., one of which had a surface unevenness and the other one had no surface unevenness or a surface unevenness different from the above surface unevenness. As a result, an increase in a local cell thickness within the cells was prevented and thus an occurrence of the yellowing was minimized.

Figure 8A:
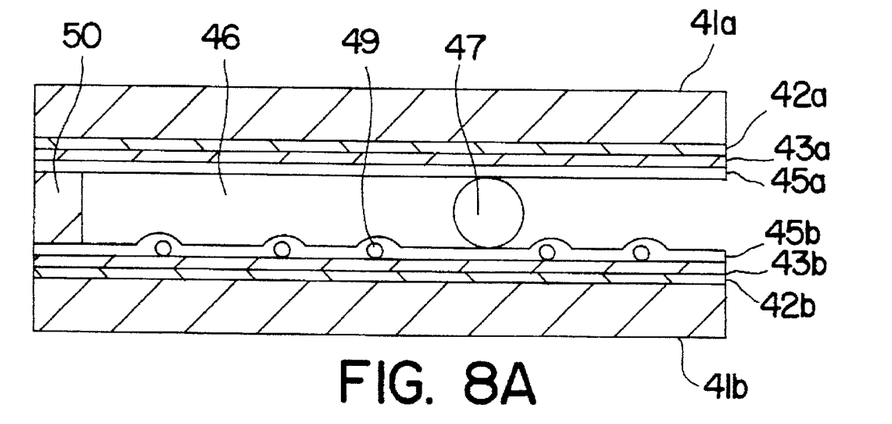
FIGS. 8A and 8B are, respectively, a schematic sectional view of an embodiment of the liquid crystal device according to the present invention wherein fine particles are dispersed in one of the alignment control layers (FIG.8A), or disposed on the surface of one of the alignment control layers (FIG. 8B).
Figure 8B:
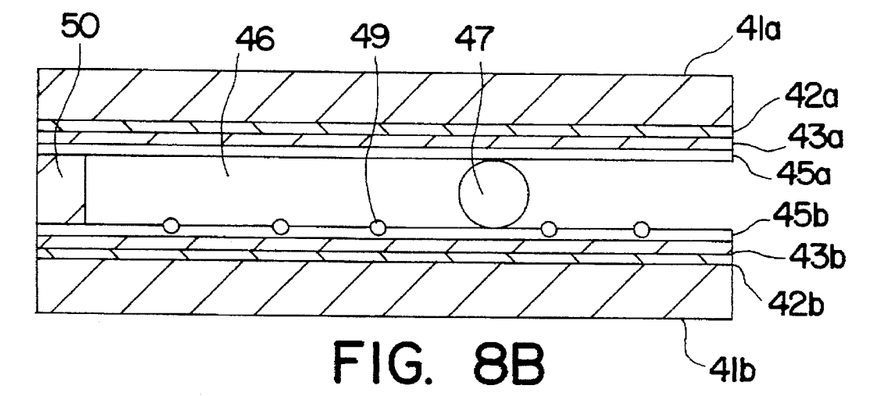

FIG. 8A shows a liquid crystal device according to the present invention in which the fine particles 49 are dispersed in one of the alignment layers (45b). FIG. 8B shows a liquid crystal device according to the present invention in which the fine particles 49 are dispersed on the surface of one of the alignment control layers (45b). The same reference numerals are used in FIG. 8A and 8B for those elements which also are illustrated in FIG. 4.

Figure 9:
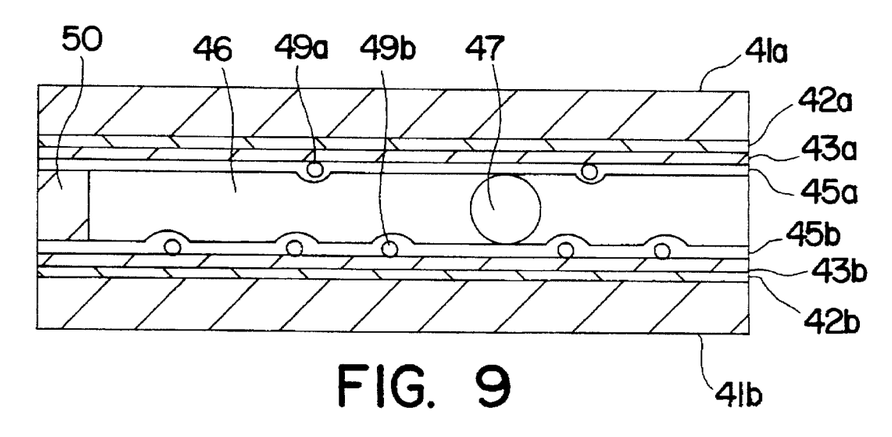
FIG. 9 is a schematic sectional view of an embodiment of the liquid crystal device according to the present invention wherein fine particles are dispersed in one of the alignment control layers to provide a first surface unevenness and fine particles are also disposed in the other of the alignment control layers to provide a second surface unevenness.

FIG. 9 shows a liquid crystal device according to the present invention in which the fine particles 49a are dispersed in one of the alignment layers (45a) and in which fine particles 49b are dispersed in the other of the alignment control layers (45b) to cause a surface unevenness in alignment layer 45a different from the surface unevenness formed in alignment layer 45b.

Accordingly, the liquid crystal device according to the present invention provides uniform display characteristics even if the liquid crystal device is used as a large-area display element in a display apparatus.

What is claimed is:

1. A liquid crystal device, comprising:

a pair of substrates disposed opposite to each other each having thereon an alignment control layer, and a liquid crystal disposed between the substrates, wherein one of the alignment control layers has an uneven surface provided with a first surface unevenness and the other alignment control layer has a an uneven surface provided with a second surface unevenness different from the first surface unevenness.

2. A device according to claim 1, wherein the liquid crystal is a ferroelectric liquid crystal.

3. A device according to claim 1, wherein the alignment control layers have been subjected to uniaxial alignment treatment so that their uniaxial alignment directions are substantially parallel to each other.

4. A liquid crystal apparatus, including: a liquid crystal device according to any one of claims 1 to 3.

5. An apparatus according to claim 4, which further includes a drive circuit for driving the liquid crystal device.

6. An apparatus according to claim 5, which further includes a light source.

7. A device according to claim 1, wherein said first and second surface unevennesses have respective densities in a range of $10^6$–$10^{12}$/mm$^2$.

8. A device according to claim 1, wherein said first and second surface unevennesses have a difference in height of 10–500 nm.

9. A device according to claim 1, wherein said first and second surface unevennesses have a difference in height of 30–200 nm.

10. A device according to claim 1, wherein said liquid crystal assumes a chiral smectic phase.

11. A device according to claim 1, wherein said first and second surface unevennesses independently have respective densities in a range of $10^5$–$10^{13}$/mm$^2$.

12. A device according to claim 1, wherein both of said pair of substrates are provided with a layer containing fine particles dispersed therein, respectively.

13. A device according to claim 1, wherein fine particles are dispersed in at least one of the alignment control layers or disposed on at least one of the surfaces of the alignment control layers thereby to provide at least one of said first and second surface unevennesses.

14. A device according to claim 13, wherein the fine particles have an average particle size of 10–100 nm.

15. A device according to claim 1, wherein fine particles are dispersed in at least one of insulating layers formed under the alignment control layers thereby to provide a corresponding one of said first and second surface unevennesses.

16. A device according to claim 15, wherein the fine particles have an average particle size of 10–100 nm.

17. A device according to claim 1, wherein at least one of said first and second surface unevennesses is provided to at least one of the alignment control layers by applying an alignment control layer-forming solution and baking the alignment control layer-forming solution under a prescribed condition.

18. A device according to claim 1, wherein said first and second surface unevennesses are provided to the respective alignment control layers by a mechanical method.

* * * * *

UNITED STATES PATENT AND TRADEMARK OFFICE
CERTIFICATE OF CORRECTION

PATENT NO. : 5,668,616

DATED : September 16, 1997

INVENTOR(S): KATSUTOSHI NAKAMURA ET AL.

Page 1 of 2

It is certified that error appears in the above-identified patent and that said Letters Patent is hereby corrected as shown below:

ON THE COVER PAGE AT [75] INVENTORS:

"Sagamiohara" should read --Sagamihara--.

DRAWINGS AT SHEET 7

Figure 7, "BUBBING" should read --RUBBING--.

COLUMN 1

Line 24, delete "a problem" (second occurrence).

COLUMN 4

Line 33, "by" should read --be--.

COLUMN 5

Line 4, "$10^5$–$10^{13}$/mm$^2$" should read --$10^5$-$10^{13}$/mm$^2$--; and "$10^6$–$10^{12}$/mm$^2$" should read --$10^6$-$10^{12}$/mm$^2$-;
Line 11, "control,layers" should read --control layers--;
Line 46, "depending" should read --dependent--.

COLUMN 7

Line 34, "(SmG)" should read --(SmG*)--.

UNITED STATES PATENT AND TRADEMARK OFFICE
CERTIFICATE OF CORRECTION

PATENT NO. : 5,668,616

DATED : September 16, 1997

INVENTOR(S): KATSUTOSHI NAKAMURA ET AL.

Page 2 of 2

It is certified that error appears in the above-identified patent and that said Letters Patent is hereby corrected as shown below:

<u>COLUMN 9</u>

Line 1, delete "in";
Line 50, "show" should read --shown--.

<u>COLUMN 13</u>

Line 46, delete "a".

Signed and Sealed this

Seventh Day of July, 1998

*Attest:*

*Attesting Officer*

BRUCE LEHMAN

*Commissioner of Patents and Trademarks*